Nov. 12, 1963   J. F. WARD ETAL   3,110,066
SELF-LOCKING MOULDING AND BUFFER STRIPS
Filed June 27, 1960

JACK F. WARD
WILLIAM W. WARD
                INVENTORS.

BY *Dillon S. Turney*
    THEIR ATTORNEY 3,110,066
Patented Nov. 12, 1963

3,110,066
SELF-LOCKING MOULDING AND BUFFER STRIPS
Jack F. Ward, E. Burlington St., and William W. Ward, 113 Iowa Ave., both of Fairfield, Iowa
Filed June 27, 1960, Ser. No. 38,850
2 Claims. (Cl. 20—74)

This invention pertains in general to mouldings, beadings, trimming strips and the like, and more particularly to an improved form of moulding, sealing and cushion strip for joining and covering exposed edges of assembled or fabricated articles.

Many articles are now constructed of stamped or formed panels, sheets or shapes and then assembled at the edges to form a unitary structure such as furniture, cabinets, marine hulls and decks, and in the use of certain materials for such articles it is often difficult to adequately cover the exposed or joined edges so as to present a pleasing and decorative appearance as well as to provide a buffer or bumper strip to absorb abrasions and shock and prevent damage to the main article or body itself.

It is desirable to provide a moulding or sealing strip which is self-locking and which can be easily and quickly applied without the use of fasteners, cements or other mechanical or adhesive means, and further to provide a moulding or bumper strip which is easily manufactured in continuous extruded lengths of tough, durable material which also has the desired resiliency to maintain the moulding in assembled position on the final assembled product.

Accordingly, it is an object of this invention to provide a moulding or sealing strip of specially designed cross-section arranged for positive gripping action on the edges of two joined or assembled panels.

It is a further object of this invention to provide a moulding or sealing strip which is easily manufactured by continuous extrusion process of plastic or other suitable compound having desired properties of strength, resilience and resistance to wear, weathering and mechanical failure.

It is another object of this invention to provide an improved self-locking construction for a moulding and buffer strip that is easily snapped into place and also removable at will.

It is a further object of this invention to provide a moulding, sealing or trim strip having a specially designed and arranged cross-section which provides a gripping action when assembled and also provides a cushioning and shock absorbing buffer or cushion when assembled in place.

Other and further objects and advantages of this invention will be apparent from a description thereof and this invention will be better understood from the following detailed specification taken in connection with the accompanying drawings and the scope of this invention will be pointed out in the appended claims.

Figure 1:
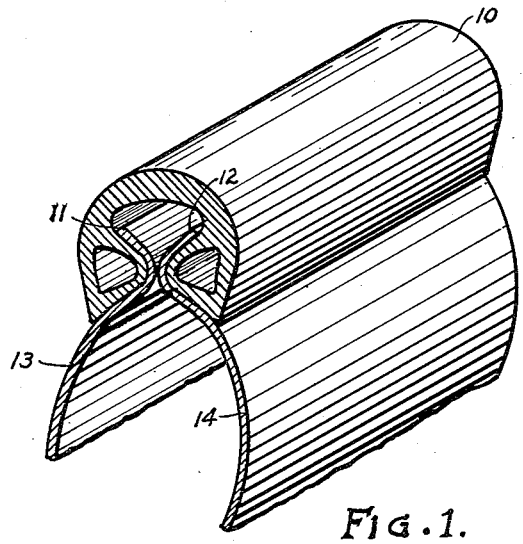

Referring now to the drawings, FIGURE 1 shows a perspective view of a portion of a continuous length of self-locking moulding applied to seal the edges of two curved panels.

Figure 2:
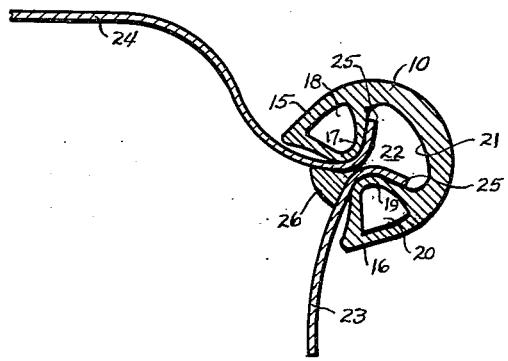

FIGURE 2 is a cross-section view of the moulding as shown in FIGURE 1, being assembled in place along the gunwale of a boat for sealing the joint between the hull section and deck section illustrating a recommended use of this invention.

Reference should now be had to FIGURE 1 which shows generally a moulding or trim strip 10 formed according to this invention by extrusion in a continuous length, and which is preferably extruded of plastic such as polyvinyl chloride, although it should be understood that other plastics, neoprenes and natural and synthetic rubber compounds can also be utilized.

The moulding 10 is shown as over-lapping and gripping the outwardly formed edges 11 and 12 of the joined panel or body sections 13 and 14 respectively, this illustration showing mainly the use of the moulding in connecting such joined body members 13 and 14 to provide a decorative seal for the joint as well as a shock resistant buffer and cushion.

Reference should now be had to FIGURE 2, which clearly shows a cross-section of the moulding 10 which, it will be noted, generally comprises an outer surface of U-shaped configuration having two extending arms 15 and 16. On the inner surface of the arm 15 is provided a curved internal wall 17 which extends inwardly from the free end of arm 15 and then curves outwardly to rejoin arm 15 at a point near where arm 15 and thickened wall portion 21 merge, the space between the points of juncture of inner wall 17 with arm 15 defining an internal cavity 18. A similar construction is shown in connection with the arm 16 in which the curved internal wall 19 forms the internal cavity 20. The moulding 10 is formed by extrusion through a die so that in the unassembled or original state, the innermost surfaces of the walls 17 and 19 will be biased together in contact relationship as they are extruded from the forming die, the thick back wall portion 21 exerting a closing tendency on the outer arms 15 and 16. This also results in a continuous cavity 22 being defined by the internal walls 17 and 19 and the back wall 21.

In FIGURE 2 the moulding is shown in use as a gunwale moulding buffer and trim strip for boats, which are now generally formed of a hull section 23 and a deck section 24 shown partially in cross-section. Modern construction practice for smaller pleasure boats has resulted in the forming of the hull sections and deck sections separately and materials such as sheet metal and fiberglass are in very common use since they lend themselves to forming the required contours, as well as being strong, weather and water resistant and easy to care for. An accepted design of assembling such hull and deck sections is shown wherein an outwardly formed edge or lip 25 is provided at the joining edge of each section and the adjacent sections are then connected to form a continuous seam by means of rivets, staples, spot welding or other means which lend themselves to economical and rapid assembly. It is then necessary to have a moulding and buffer or cushion strip to cover the seam, and the extruded moulding which forms the subject of this invention is admirably suited for this purpose.

In applying the moulding 10, it is only necessary to pry the outer ends 15 and 16 of the U-shaped member apart until the moulding can be snapped in place over the outwardly turned edges 25, at which time the natural resiliency formed into the moulding 10 in the extrusion process will cause it to tightly grip the internal channels or grooves formed by the outwardly turned edges 25 and hold it securely in place without any other fastening means being required. Thus, a self-locking gunwale strip or rub-rail is provided. It is obvious that the gripping and locking action alone is not sufficient to insure a water-tight seal; however, this is generally provided by means of caulking or sealing compound 26 which can be applied either on the inner surface of the joint as shown or on the opposite surface of the joint, or in both places if necessary.

The buffer strip and gunwale moulding, due to the provision of the dead air space and cavities 18, 20 and 22, provides a resilient cushion and shock absorbing member which will considerably reduce shock and possible damage to the boat hull in the same manner as a pneumatic tire or cushion. As mentioned, the moulding 10 is preferably formed of plastics which are water resistant, weather and sun resistant as well as withstanding a wide range of temperature extremes without softening or hardening to an undesirable extent. Another advantage is present in the fact that such plastic extrusions can be colored in manufacture to any desired decorative color, and can also be provided with a highly polished glaze surface finish if desired at very little expense.

It should be understood that the moulding as shown in this invention in the particular cross-section configuration as shown is not restricted to marine use or boat use but can also be equally well adapted to sealing and protecting joints in metal furniture, metal cabinetry or other assemblies wherein a decorative moulding and trim strip is desired, and which will also act as a shock absorbing buffer or cushion to prevent damage to the basic article, the chief advantage lying in the fact that this moulding construction quickly snaps and locks into place and is maintained in place by its natural resiliency and compression and eliminates the need for additional fastenings to secure the same. In a like manner, if disassembly or repairs are required, it can be removed quickly and easily by disengaging the arms 15 and 16 from the reentrant grooves or channels into which they fit. The exact shape and configuration of the cavities 18 and 20 is not critical and may be larger or smaller than shown, the essential feature of this invention being in the provision of a multi-cavitied moulding providing the snap action or lock-on feature by means of the inwardly extending wall sections 17 and 19 at the outer end of each arm of the moulding 10.

While we have shown and described a particular embodiment and form of this invention, it will be apparent to those skilled in the art that certain changes and modifications may be made therein without departing from this invention in its broader aspects and we, therefore, aim in the appended claims to cover any and all such modifications as may be made without departing from the true spirit and scope of this invention.

What we claim as new and desire to secure by Letters Patent of the United States is:

1. In combination with an assembled article of manufacture having an edge formed by two outwardly flaring adjacent elements; a moulding and cushioning strip applied over said edge, said strip comprising a continuous length of integrally formed resilient material having a U-shaped cross section comprising a pair of arms connected by a thickened wall portion with an arcuate inner wall formed on the interior of each said arm, each said inner wall extending from the free end of said arm inwardly until immediately adjacent the inner wall formed on the opposite arm, when said strip is in an undistorted condition, and outwardly to join said arm at a point where said arm and said thickened wall portion merge, the space between the points of juncture of said inner walls with said arms defining a pair of first cushioning cavities, said inner walls and said thickened wall portion being spaced to define a second cushioning cavity; and said strip being positioned over said edge with each of said flaring elements engaged by one of said inner walls.

2. In combination with a boat gunwale, a gunwale molding and trim strip for covering and protecting the gunwale of fabricated boats, said boats being constructed with hull and deck sections mechanically joined with a continuous external seam and said seam being provided with outwardly flaring edges lying externally thereof, said gunwale molding comprising a continuous length of integrally formed resilient material having a U-shaped cross-section comprising a pair of arms connected by a thickened wall portion with an arcuate inner wall formed on the interior of each said arm, each said inner wall extending from the free end of said arm inwardly until immediately adjacent the inner wall formed on the opposite arm, when said strip is in an undistorted condition, and outwardly to join said arm at a point where said arm and said thickened wall portion merge, the space between the points of juncture of said inner walls with said arm defining a pair of first cushioning cavities; said inner walls and said thickened wall portion being spaced to define a second cushioning cavity; said strip engaging and completely covering and protecting the joined seam of said boat hull and deck sections, and said inner walls securely overlapping and gripping said outwardly flaring edges.

References Cited in the file of this patent

UNITED STATES PATENTS

| | | |
|---|---|---|
| 1,868,726 | Collier | July 26, 1932 |
| 1,903,225 | Palenske | Mar. 28, 1933 |
| 2,433,171 | Tegarty | Dec. 23, 1947 |
| 2,823,430 | Morton | Feb. 18, 1958 |
| 2,851,744 | Oehmig | Sept. 16, 1958 |
| 2,931,086 | Rose | Apr. 5, 1960 |
| 2,983,014 | Greenwood | May 9, 1961 |
| 3,019,758 | Erkert | Feb. 6, 1962 |